Patented Oct. 17, 1950

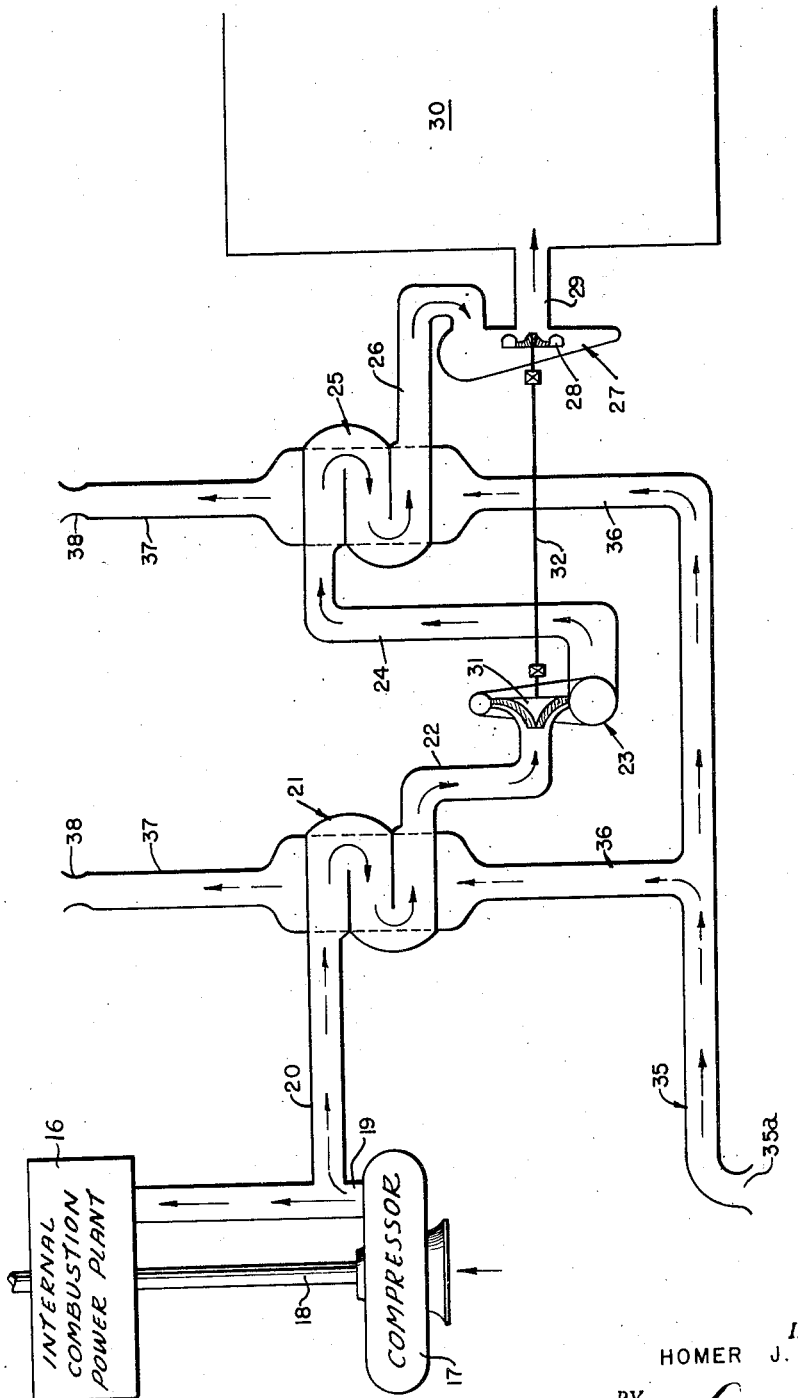

2,526,103

UNITED STATES PATENT OFFICE 2,526,103

CABIN COOLING SYSTEM FOR AIRCRAFT

Homer J. Wood, Los Angeles, Calif., assignor to The Garrett Corporation, Los Angeles, Calif., a corporation of California Application April 6, 1946, Serial No. 660,178

9 Claims. (Cl. 62—136)

My invention relates to the art of conditioning air for use in the cabin of an aircraft; and it relates more particularly to a simple economical system wherein atmospheric air and an expansion turbine are employed to extract heat from initially compressed air preparatory to supplying the air to the aircraft cabin.

The form of my invention disclosed herein is designed for, but is not limited to, pressurized high speed transport aircraft. It is applicable to aircraft having various propulsion means, such as, for example, piston engines driving compressors supplying air for cabin pressurization, or to aircraft propelled by gas turbines.

It is an object of my invention to provide a system or mechanism which first compresses the air, then passes it through successive stages of air cooling to reduces the temperature of the compressed air, and then passes the air through an expansion turbine for further cooling of the air before delivering the air to the cabin, the work extracted by the cooling turbine being used to further compress the air prior to its final air cooling stage in order to build up a higher pressure ratio and thus obtain a lower discharge temperature from the expansion turbine into the cabin.

It is a further object of my invention to provide method and apparatus whereby there is established a flow of air from the pressure side of the compressor of a gas turbine unit, to the cabin of the aircraft and in which flow path there is located cooling means and power absorbing parts which are driven by the flow of air in said path, the absorbing of power by said parts extracting heat from said flow of air, and the work abstracted from said flow of air being employed to further compress the air prior to its final cooling.

Other objects and advantages of the invention will be brought out during the course of the following description of the form of my invention schematically illustrated in the accompanying drawing.

In the drawing I have diagrammatically illustrated a system incorporating the features of my invention, which system is capable of performing the method of my invention. The numeral 17 represents a supercharger or compressor driven by any suitable power source (as shown) through shaft 18. The compressor 17 delivers compressed air to a duct 19 for supplying the power plant 16 of the airplane. My invention provides a conduit 20 for diverting a portion of this compressed air from duct 19 to a cabin air conditioning system, the first element of which is a first cooler 21 wherein its temperature is reduced but its pressure is maintained. The compressed air is then passed from the first cooler 21 into a conduit 22 to a second compressor 23, wherein the air is further compressed. From the compressor 23 air flows through a conduit 24 to a second cooler 25 wherein the compressed air is again cooled. The air then flows through a conduit 26 into a cooling turbine 27 wherein the air is brought into contact with working parts such as a rotor 28, which parts extract or absorb work from the air and expanded into a conduit 29 through which it flows into the cabin 30. The cooling turbine 27 operates to further reduce the temperature of the air and reduce its pressure so that it is suitable for use in the cabin.

The rotor 28 of the cooling turbine 27 is caused to drive the impeller 31 of the second compressor 23, by means of a suitable shaft connection 32. The work abstracted from the compressed air in the cooling turbine 27 is thus employed to compress the air before it reaches the second cooler 25. In this way, without requiring power from an outside source, it is possible to increase the pressure of the air flowing to the turbine and to thus produce a higher pressure ratio, which gives a lower discharge temperature of air from the cooling turbine into the cabin.

For the purpose of cooling the compressed air in the first and second coolers 21 and 25 I provide a conduit 35 which is connected to an air ram 35a. Ambient air is delivered by the conduit 35 to the branch conduits 36, and the air thus flows in parallel through each of the coolers 21 and 25. The coolers 21 and 25 are of any convenient design wherein the compressed air to be cooled is brought into heat transfer relation with the ambient air flowing through the branch conduits 36. The cooling air passes from the coolers 21 and 25 through outlet conduits 37 which are provided with exit jets 38.

From the foregoing description it will be seen that the original compression of the air supplied to the cabin is done by the compressor 17, which in the form of my invention disclosed herein has the principal function of providing compressed air for an internal combustion propulsion means 16. My invention is not limited to the use of the particular type of compressor shown or of any particular type of propulsion means, or combination thereof. The internal combustion means may for instance be an engine of piston and cylinder type and the compressor may be a supercharger therefor. In other cases the source of compressed air for the cabin conditioning system may be a compressor and turbine combination.

It will further be seen that power from the expansion turbine 27 is used to increase the available pressure by causing it to drive the second compressor 23. Furthermore, no additional compressors or power sources are required for the circulation of cooling air though the first and second coolers 21 and 25 since rammed air is employed.

My invention is not limited to the form disclosed herein, but various modifications and alterations could be made by those skilled in the art. I, therefore, wish my invention to be broadly construed in accordance with the statement of invention and the appended claims.

I claim:

1. Mechanism for conditioning air to be supplied to the cabin of aircraft, the combination including: internal combustion power means including a compressor for supplying the power means with compressed air; a conduit for conveying compressed air from the pressure side of said compressor to said cabin; first and second coolers in said conduit through which said compressed air is passed for cooling same; means for supplying ambient air to said coolers for cooling the compressed air passing therethrough; an expansion turbine in said conduit on the discharge side of said second cooler for further cooling said air; and a second compressor in said conduit between said coolers, driven by said turbine whereby work extracted by said turbine is used to increase the pressure ratio of said compressed air at said turbine and thus obtain a lower discharge temperature of the air supplied to said cabin.

2. Mechanism for conditioning air to be supplied to the cabin of aircraft, the combination including: internal combustion power means including a compressor for supplying the power means with compressed air and an air ram for supplying air to said compressor; a conduit for conveying compressed air from the pressure side of said compressor to said cabin; a first cooler in said conduit to which said compressed air is delivered from said compressor; a second compressor in said conduit for further compressing the air from said first cooler; a second cooler in said conduit for cooling the air from said second compressor; an expansion turbine in said conduit on the discharge side of said second cooler for further cooling said air; and means for delivering power recovered by said turbine to said second compressor to drive the same.

3. A method of cooling air for use in the cabin of an aircraft having an internal combustion power means including a compressor for supplying it with air, the steps of bleeding air from the pressure side of the compressor of said internal combustion power means; cooling said air in two stages by use of ambient air; passing the cooled compressed air through an expansion turbine for further cooling same; and using the power extracted by said turbine to further compress said air prior to said second stage of cooling.

4. In mechanism for conditioning air to be supplied to the cabin of aircraft: internal combustion power means including a compressor for supplying the power means with air to support combustion in the operation of the power means; duct means arranged to bleed off compressed air from the pressure side of said compressor and conveying same to the cabin; cooler means connected to the duct means so as to cool the compressed air which passes through said duct means; coolant duct means for carrying ambient air; means connecting portions of said cooler means to said coolant duct means in parallel relation so as to pass separate flows of ambient air through said cooler means for cooling the compressed air passing therethrough; an expansion engine connected into said duct means so as to be driven by and cool the compressed air after it has left said cooler means; and a second compressor connected to said duct means and being driven by said expansion engine so as to apply further compressive force to the compressed air in said duct means.

5. In mechanism for conditioning air to be supplied to the cabin of aircraft: internal combustion power means including a compressor for supplying the power means with air to support combustion in the operation of the power means and an air ram for supplying air to said compressor; duct means arranged to bleed off compressed air from the pressure side of said compressor and conveying same to the cabin; cooler means connected to the duct means so as to cool the compressed air which passes through said duct means; an expansion engine connected into said duct means so as to be driven by and cool the compressed air after it has left said cooler means; and a second compressor connected to said duct means and being driven by said expansion engine so as to apply further compressive force to the compressed air in said duct means.

6. Mechanism for cooling air to be delivered to an aircraft enclosure, comprising: an air duct having an air ram inlet at one end for taking ram air under compression from the atmosphere, and being connected to the enclosure at its other end; an engine-driven compressor on the downstream side of said air ram inlet for further compressing said ram air; first and second heat exchangers in said air duct on the downstream side of said engine-driven compressor, and through which the air to be delivered to said enclosure is passed, said heat exchangers having coolant air ducts for delivering separate streams of coolant air through said heat exchangers; an expansion turbine in said air duct on the downstream side of said second heat exchanger; a second compressor in said air duct between said heat exchangers; and means by which said expansion turbine drives said second compressor.

7. Mechanism for cooling and delivering air to an aircraft enclosure comprising: first and second heat exchangers each having first and second passages in heat transfer relation; ram means for taking air from the exterior of said aircraft, said air being compressed by the ram action caused by the movement of the aircraft; an engine-driven compressor for further compressing the air taken into the air craft through said ram means; means for conducting the compressed air to the first passage means of said first heat exchanger; a second compressor for compressing the cooled air from said first passage means of said first heat exchanger and delivering the same to the first passage means of said second heat exchanger; an expansion turbine for receiving and expanding the compressed and cooled air from said first passage means of said second heat exchanger; duct means for delivering the expanded and cooled air to the aircraft enclosure; ducts for passing separate flows of ambient air through said second passage means of said first and second heat exchangers, said last-mentioned ducts having ram inlet means whereby the coolant air is compressed by the ram action; and means for delivering power recovered from said expansion turbine to said second compressor to drive the same.

8. A method of cooling air for use in the enclosure of an aircraft, the steps of: taking air from the exterior of the aircraft by ram action which compresses the air; further compressing said air by energy derived from a part of the propulsion system of the aircraft; cooling said air in two stages by use of ambient air taken from the exterior of the aircraft by ram action and passed in separate streams in heat transfer relation to the said first-mentioned air; passing the cooled compressed air through an expansion turbine for further cooling same; and using the power extracted by said turbine to further compress said air prior to said second stage of cooling.

9. A method of cooling air for use in the enclosure of an aircraft, the steps of: initially compressing ambient air by taking same by ram action from the exterior of the aircraft; further compressing said air by using power derived from a separate power source on the aircraft; cooling said compressed air by passing it in heat transfer relation to coolant air derived from the exterior of the aircraft by ram action; further compressing said air; further cooling said compressed air by passing it in heat transfer relation to a second stream of coolant air derived from the exterior of the aircraft by ram action; passing said cooled compressed air through an expansion turbine for further cooling same; and using the power extracted by said turbine to carry out said step of further compressing said air prior to said second stage of cooling.

HOMER J. WOOD.

REFERENCES CITED

The following references are of record in the file of this patent:

UNITED STATES PATENTS

| Number | Name | Date |
| --- | --- | --- |
| 2,077,315 | Ewing | Apr. 13, 1937 |
| 2,174,584 | Imus | Oct. 3, 1939 |
| 2,391,838 | Kleinhans | Dec. 25, 1945 |